F. MAUHART, Jr.
ATTACHMENT FOR EYEGLASSES.
APPLICATION FILED NOV. 29, 1916.
1,280,515.
Patented Oct. 1, 1918.
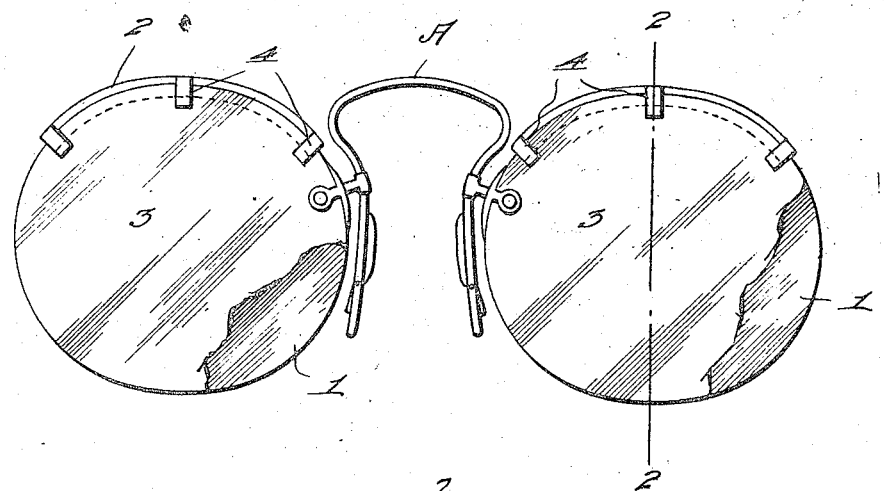
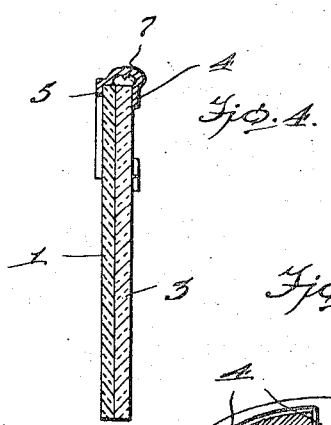
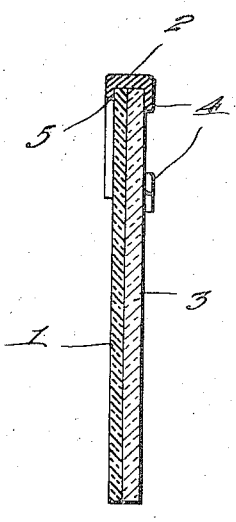
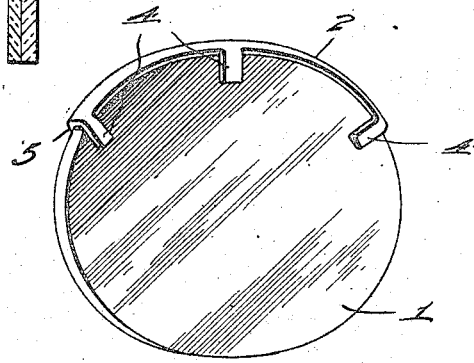
Frank Mauhart Jr.
Inventor
By Geo. P. Kimmel
Attorney

UNITED STATES PATENT OFFICE.

FRANK MAUHART, JR., OF PLAINFIELD, NEW JERSEY.

ATTACHMENT FOR EYEGLASSES.

1,280,515.     Specification of Letters Patent.     Patented Oct. 1, 1918.

Application filed November 29, 1916. Serial No. 134,122.

*To all whom it may concern:*

Be it known that I, FRANK MAUHART, Jr., a citizen of the United States, residing at Plainfield, in the county of Union and State of New Jersey, have invented certain new and useful Improvements in Attachments for Eyeglasses, of which the following is a specification.

My invention relates to new and useful improvements in spectacles and eyeglasses and has particular reference to a clamping means to attach a supplemental lens to the lens of the glasses or spectacles.

The object of my invention is to provide means for attaching an amber, reading lens or a supplemental lens of any description to eyeglasses or spectacles.

A still further object of my invention resides in the provision of a clamping device of the class described that is simple in construction, efficient in operation and that can be manufactured and placed on the market at a minimum cost.

Other objects as well as the nature, characteristic features and scope of my invention will be more readily understood from the following description taken in connection with the accompanying drawings and pointed out in the claims forming a part of this specification; in which:—

Figure 1 is a front elevation of a pair of glasses with my invention applied.

Fig. 2 is a section of the same on the line 2—2 of Fig. 1;

Fig. 3 is a perspective view of my invention attached to a supplemental lens; and Fig. 4 is a modified form of my invention in section.

Referring more particularly to the drawings, wherein similar characters of reference designate like and corresponding parts throughout the various views, in which A designates a pair of rimless eyeglasses in its entirety having a pair of supplemental lenses 1 attached thereto by means of a clamping member comprising a pair of metallic strips 2 conforming in shape to the contour of the eyeglass lens. The said strips are carried by the supplemental lens and are adapted to be inserted over the lens 3. The fingers 4 on one side of the strip are bent laterally of the said strip forming spring arms. The said spring fingers are provided to accommodate my clamping means to lenses of various thicknesses. The opposite side of the strip 2 is provided with a flange 5 bent laterally of the strip and carried by the supplemental lens. In the modified form of my invention shown in Fig. 4 I provide a groove 7 to accommodate the rim of spectacles. The other features of my device are similar to those of my preferred form.

My invention is particularly adapted for attaching the common form of amber glasses to the lens of the spectacles or eyeglasses which may be worn for ordinary use.

It will be understood that the above description and accompanying drawing comprehend only the general embodiment of my improved clamp and that various minor changes in detail of construction, proportion and arrangement of parts may be made within the scope of the appended claims and without sacrificing any of the advantages of my invention.

Having thus fully described my invention, what I claim as new and desire to secure by Letters Patent, is:—

1. The combination with the lenses of a pair of eye glasses, of supplemental lenses arranged adjacent said first lenses, arcuate metal strips having fingers formed thereon in spaced relation and extending at substantially right angles therefrom adapted to be detachably engaged with certain of the marginal portions of said first and second mentioned lenses for securing the same in their adjacent positions.

2. A clamp of the character described comprising an arcuate strip of spring metal having fingers formed thereon and extending at substantially right angles thereto for engaging and securing the main and supplemental lenses of eye glasses in adjacent positions.

In testimony whereof, I affix my signature hereto.

FRANK MAUHART, JR.